United States Patent Office 2,965,464
Patented Dec. 20, 1960

2,965,464

COMPOSITIONS FOR PREPARING BONDED ABRASIVES

Walter E. F. Rupprecht, Midland, Mich., assignor to The Dow Chemical Company, Midland, Mich., a corporation of Delaware No Drawing. Filed Dec. 12, 1958, Ser. No. 779,828

4 Claims. (Cl. 51—298)

This invention relates to improved compositions which are useful in the preparation of bonded abrasives, such as abrasive wheels. More particularly it relates to such compositions utilizing improved temporary binders.

This application is a continuation-in-part of U.S. Serial No. 680,017, filed August 23, 1957, and now abandoned.

Bonded abrasives find widespread usage wherever metal good are worked or fabricated for polishing, sharpening, dimensionalizing, or otherwise shaping the metal article into the desired end product. Among the most common of the bonded abrasives is the well-known abrasive wheel. Some of those wheels are prepared by shaping and subsequently vitrifying a composition of an abrasive and a permanent binder for that abrasive. The permanent binder must meet rigid standards to be acceptable as such, since it must be a part of the final article and, as such, will be subjected to the most rigorous of operating conditions. Those permanent binders, therefore, are frequently chosen from vitrifiable ceramic materials, and like materials. Such binders have met the tests admirably. However, vitrifiable ceramic compositions must be molded and then subjected to certain materials handling operations before firing or fusing and, until they have been fired or fused, such permanent binders have insufficient binding power to maintain the molded shape of the article being manufactured. In order to overcome such difficulty, temporary binders which are capable of maintaining the shape of the article up to firing or fusing and also are combustible or decomposable during the firing or fusing step have been used. The common temporary binders of the prior art include waxes, wax emulsions, waste sulfite liquors, and similar materials. However, each of the prior known temporary binders suffered from one or more disadvantages, including the results of not forming a temperature insensitive, free-flowing mix, of poor strength for the unfired article, and also the appearance of cracks or objectionable crazing in the fired article. Because of those inherent difficulties with the temporary binders that have heretofore been employed, there has been continuous search for improved materials.

It is, therefore, the principal object of this invention to provide an improved composition for use in preparing bonded abrasives.

It is a further object to provide an improved temporary binder for use in such compositions.

The above and related objects are achieved by means of a composition consisting essentially of an abrasive grit, a vitrifiable ceramic permanent binder, and, as a temporary binder therefor, a particular combination of two polymer latexes as will hereinafter be further and more fully described. Bonded abrasive articles prepared from the compositions of the invention are substantially free of cracks and are not appreciably subject to the other similar defects noticed when the articles were prepared from prior known compositions.

The different types of known abrasive grains, such as crystalline alumina, silicon carbide, boron carbide, tungsten carbide, as well as garnet, quartz and the like may all be bonded by means of this temporary binder. The grit size of the abrasive that is used may be as desired to best meet particular requirements. Likewise, the moldable composition may contain inert material, such as clay, asbestos, sand, and the like, in order to make a stronger body or to impart other desired physical characteristics thereto, or to cut down the amount or the cost of the permanent binder employed.

The permanent binder may be selected from those materials which are well-known to be useful in this application. Typical of such materials are the vitrifiable ceramic materials. The permanent binder must not decompose at the temperature of combustion or decomposition of the novel temporary binder.

The novel temporary binder of this invention consists of a combination of a latex of a vinyl chloride-vinylidene chloride copolymer and a latex of a styrene-butadiene copolymer. The combination consists of about commensurate, preferably of equal weights of the polymeric solids of each latex. As indicated, either may be employed in a slight excess of about 10 percent of the other without serious loss of binding capacity. However, neither latex should be used in a predominant excess of the other, because when the vinyl-vinylidene chloride polymer latex is present in preponderant amount there is inadequate binding power. When the styrene-butadiene copolymer latex is in preponderant concentration, the fused or fired article exhibits cracks and other defects, and the mix is not free-flowing and consequently is difficult to feed into the mold.

The vinyl chloride-vinylidene chloride latexes which are suitable within the compositions are those of copolymers prepared from monomeric mixtures rich in vinyl chloride monomer. A particularly useful copolymer latex and one which is preferred is that prepared from a monomeric mixture of about 75 percent vinyl chloride and correspondingly about 25 percent of vinylidene chloride, each percentage being a weight percent value.

The styrene-butadiene copolymer latexes which are useful are those containing from about 30 to 50 percent by weight of styrene, the balance being butadiene. A preferred latex is that prepared from about 33 percent styrene and 67 percent butadiene, both percentages being by weight.

The above latexes are standard items of commerce. They are available commercially from various sources or may be prepared by known emulsion polymerization procedures using the indicated monomeric materials.

The temporary binder of this invention, when it is mixed with the other ingredients of the composition, results in a granular, free-flowing mix which is well adapted to be fed at high, uniform rates into conventional molding equipment. When molded by the usual methods, the "green" articles have sufficient strength to withstand the normal materials handling operations before firing or fusing. In addition the temporary binder is completely burned out of the composition at the usual firing temperatures used with the vitrifiable ceramic bonds without leaving a carbon residuum in the fired article. The presence of carbon residua seriously reduces the strength of the abrasive article.

These temporary binders need only be employed in the minimum concentration required to provide adequate strength to the composition when molded but unfired. That concentration will vary somewhat depending upon the particle size of the abrasive grit and the nature of the particular polymers comprising the temporary binder. It has been found that usually at least 5 percent of the total weight of the composition will suffice to provide adequate binding power for the molded articles to be handled. Rarely will the compositions require more than about 15 percent of the total weight of the composition. As a general rule it is desirable to obtain a molded but unfired strength which will withstand without rupture or crumbling an applied load of 5 pounds per square inch or more. Thus, the optimum concentration of temporary binder is easily determined by simple preliminary experiments.

The preparation of bonded abrasive articles is accomplished by first thoroughly intermixing all ingredients, which are to make up the article. As a matter of convenience it has been found to be most practical to admix all of the ingredients except the latexes and then to blend in the combination of latexes. The mix may then be molded by pressure alone or, if desired, with slightly elevated temperatures. The "green" molded object thus obtained is then transferred to a kiln or other suitable device for firing or fusing the object into the final article. The firing or fusing must take place at a temperature well above the temperature of combustion of the temporary binder. All completely organic materials will be burned out at from about 500 to 600° C. As is common in this art the firing and fusing temperatures are above this range and may even be of about 1300° C. or higher. Operating conditions, such as pressures, temperatures, times of molding and firing, are well known to those skilled in the art or may be determined by simple preliminary experiments.

The temporary binders of this invention are of particular use in compositions which are to be employed in making those bonded abrasive articles which use a thermally insensitive binder. These compositions exhibit good flame-out characteristics under the controlled combustion of a kiln or the like, so that no carbon residuum remains in the fired article and no cracks or defects appear.

The advantages of the compositions of this invention will be more apparent from the following illustrative examples wherein all parts and percentages are by weight.

EXAMPLES

Several compositions were prepared from a base mixture consisting of 92 parts of a silicon carbide abrasive grit having a particle size that will pass through a 30 mesh sieve and rest on a 60 mesh sieve of the United States Standard Sieve Series, and 8 parts of a conventional vitrifiable ceramic material as a permanent binder. To each composition were added varying amounts of latexes as temporary binders in proportions listed in the table. Latex A was prepared by the emulsion polymerization of 75 percent vinyl chloride and 25 percent vinylidene chloride and contained 50 percent of nonvolatile solids. Latex B was prepared by the emulsion polymerization of 32.5 percent styrene and 67.5 percent butadiene; and Latex C of 20 percent styrene and 80 percent butadiene.

The compositions were prepared by premixing the grit and permanent bond to a homogeneous state. To that premix were added the latexes. After addition of the latexes, mixing was continued until the mass became crumbly. The water was then volatilized from the crumbly mass to leave it in a free-flowing, granular state which was poured into molds, pressed, and kiln-fired at about 600° C. for 36 hours to form bonded abrasive articles.

Test bars were prepared from the pressed but unfired mass. These bars were 1 inch by 1 inch by 7 inches and were prepared by compressing the mass under 1400 to 1800 pounds per square inch. The pounds load required to break the test bars was determined. For commercial acceptability that value should be at least 5.

Table

| Composition | Latex (parts of solids) | | | Load to break test bars |
|---|---|---|---|---|
| | A | B | C | |
| For Comparison: | | | | |
| 1 | 6.4 | | | 2.5 |
| 2 | | 5 | 5 | 5.5 |
| Compositions of this invention: | | | | |
| 3 | 5 | 5 | | 5 |
| 4 | 4.8 | 3.2 | | 8 |
| 5 | 6 | 4 | | 10 |
| 6 | 3.2 | 4.8 | | 5.5 |
| 7 | 4 | 6 | | 5.5 |

The acceptability of the compositions employing the temporary binder of this invention is readily apparent.

When the compositions were prepared using only Latex B as the sole temporary binder, the result was a mix which was not free flowing.

Composition 2 employing two different styrene-butadiene latexes provided adequate "green" strength but had very poor flame-out characteristics and left a large carbon residuum in the article.

What is claimed is:

1. An improved composition for use in preparing bonded abrasive articles consisting essentially of an abrasive grain, a permanent binder which is thermally insensitive at the temperature of combustion of the temporary binder, and, from about 5 to 15 percent by weight of the composition of a temporary binder therefor, said temporary binder consisting of a blend of polymer latexes in about equal weights of polymeric solids, one of the latexes of said blend being the emulsion polymerizate of a vinylidene chloride-vinyl chloride comonomeric mixture, the other latex of said blend being the emulsion polymerizate of a styrene-butadiene comonomeric mixture.

2. The composition claimed in claim 1, wherein said vinylidene chloride-vinyl chloride comonomeric mixture consists preponderantly of vinyl chloride.

3. The composition claimed in claim 1, wherein said styrene-butadiene comonomeric mixture contains from about 30 to about 50 percent by weight of styrene.

4. The composition claimed in claim 1, wherein said permanent binder is a vitrifiable ceramic material.

References Cited in the file of this patent

UNITED STATES PATENTS 2,121,018    Carter et al. _____ June 21, 1938